(12) United States Patent  
Zhou et al.

(10) Patent No.: US 11,138,479 B2  
(45) Date of Patent: Oct. 5, 2021

(54) METHOD FOR VALUATION OF IMAGE DARK DATA BASED ON SIMILARITY HASHING

(71) Applicant: Huazhong University of Science and Technology, Wuhan (CN)

(72) Inventors: Ke Zhou, Wuhan (CN); Yu Liu, Wuhan (CN); Yujuan Yang, Wuhan (CN); Hua Wang, Wuhan (CN); Chunhua Li, Wuhan (CN); Yangtao Wang, Wuhan (CN); Yifei Liu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 146 days.

(21) Appl. No.: 16/526,967

(22) Filed: Jul. 30, 2019

(65) Prior Publication Data

US 2020/0410304 A1    Dec. 31, 2020

(30) Foreign Application Priority Data

Jun. 26, 2019    (CN) .......................... 201910557932.9

(51) Int. Cl.
*G06K 9/66* (2006.01)
*G06F 16/538* (2019.01)
(Continued)

(52) U.S. Cl.
CPC ............. *G06K 9/66* (2013.01); *G06F 16/137* (2019.01); *G06F 16/538* (2019.01); *G06F 17/16* (2013.01); *G06K 9/6215* (2013.01); *G06N 3/08* (2013.01)

(58) Field of Classification Search
CPC ...... G06K 9/66; G06K 9/6215; G06K 9/6256; G06K 9/4628; G06K 9/46; G06K 9/00744;
(Continued)

(56) References Cited

U.S. PATENT DOCUMENTS 9,589,208 B2 *   3/2017   Jing ...................... G06F 40/169
9,792,304 B1 *  10/2017   Buddemeier ....... G06F 16/5866
(Continued)

OTHER PUBLICATIONS

"Deep Self-Taught Hashing for Image Retrieval"; Yu Liu, IEEE Transactions on Cybernetics, vol. 49, No. 6, Jun. 2019 (Year: 2019).*

(Continued)

*Primary Examiner* — Michael S Osinski
(74) *Attorney, Agent, or Firm* — Matthias Scholl P.C.; Matthias Scholl

(57) ABSTRACT

A method for valuation of image dark data based on similarity hashing, the method including: (1) acquiring a dark dataset, and inputting the dark dataset into a trained deep self-taught hashing algorithm model to obtain a hash code of each image in the dark dataset; (2) constructing a hash map according to the hash code of each image in the dark dataset obtained in (1), where the hash map includes a plurality of nodes, each node represents the hash code of each image; (3) acquiring a significance score of each node in the hash map obtained in (2); and (4) sorting significance scores of the plurality of nodes obtained in (3) in a descending order, and outputting images corresponding to top k significance scores of the plurality of nodes to users, where k is a natural number.

9 Claims, 2 Drawing Sheets

Figure 1:
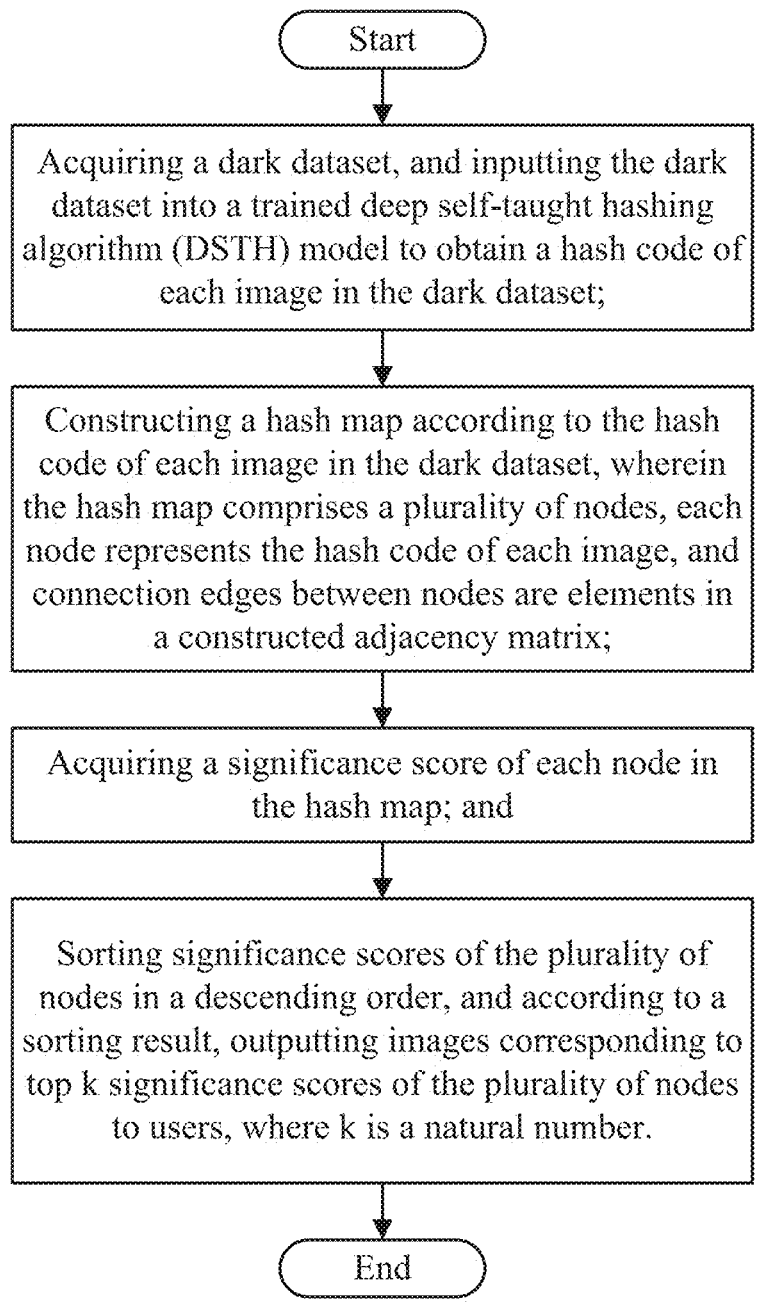

(51) Int. Cl.
*G06F 16/13* (2019.01)
*G06F 17/16* (2006.01)
*G06K 9/62* (2006.01)
*G06N 3/08* (2006.01)

(58) Field of Classification Search
CPC ............... G06K 9/4671; G06K 9/6202; G06K 9/00671; G06K 9/00758; G06K 9/6211; G06K 9/6232; G06K 9/6257; G06K 9/627; G06F 16/538; G06F 16/137; G06F 16/13; G06F 16/51–55; G06F 16/5838; G06F 16/5846; G06F 16/248; G06F 16/325; G06F 16/31; G06F 16/313; G06F 16/316; G06F 16/9014; G06F 17/16; G06N 3/08; G06N 3/0454; G06N 3/04; G06N 3/084; G06N 7/005
See application file for complete search history.

(56) References Cited

U.S. PATENT DOCUMENTS

| | | | | |
|---|---|---|---|---|
| 10,438,091 | B2* | 10/2019 | Li | G06K 9/6227 |
| 10,776,685 | B2* | 9/2020 | Lin | G06F 16/583 |
| 10,902,052 | B2* | 1/2021 | Bolin | G06N 3/08 |
| 2012/0030234 | A1* | 2/2012 | Ramachandrula | G06F 16/5846 |
| | | | | 707/769 |
| 2012/0051628 | A1* | 3/2012 | Noguchi | G06K 9/6211 |
| | | | | 382/159 |
| 2012/0076422 | A1* | 3/2012 | Yang | G06T 1/0028 |
| | | | | 382/201 |
| 2013/0208942 | A1* | 8/2013 | Davis | H04N 19/176 |
| | | | | 382/100 |
| 2013/0266195 | A1* | 10/2013 | Shiell | G06K 9/621 |
| | | | | 382/118 |
| 2013/0290330 | A1* | 10/2013 | Yoon | G06F 16/5846 |
| | | | | 707/736 |
| 2014/0149723 | A1* | 5/2014 | Junghans | G06F 9/3838 |
| | | | | 712/226 |
| 2015/0055855 | A1* | 2/2015 | Rodriguez | G06K 9/6259 |
| | | | | 382/159 |
| 2015/0088794 | A1* | 3/2015 | El-Yaniv | G06F 16/24578 |
| | | | | 706/12 |
| 2015/0169754 | A1* | 6/2015 | Gu | G06F 16/5838 |
| | | | | 707/728 |
| 2015/0286894 | A1* | 10/2015 | Cho | H04N 21/278 |
| | | | | 382/201 |
| 2016/0124996 | A1* | 5/2016 | Datta | G06F 16/532 |
| | | | | 382/155 |
| 2017/0357878 | A1* | 12/2017 | Sawhney | G06K 9/00684 |
| 2018/0121820 | A1* | 5/2018 | Manasse | G06F 17/18 |
| 2019/0034764 | A1* | 1/2019 | Oh | G06F 21/31 |
| 2019/0080177 | A1* | 3/2019 | Xu | G06F 16/735 |
| 2019/0295255 | A1* | 9/2019 | Viola | G06K 9/3233 |
| 2019/0319890 | A1* | 10/2019 | Alam | H04L 45/742 |
| 2019/0391917 | A1* | 12/2019 | Barker | G06F 16/119 |
| 2020/0065395 | A1* | 2/2020 | Pereira | G06F 16/2237 |
| 2020/0272745 | A1* | 8/2020 | Bott | H04L 9/0897 |
| 2020/0311473 | A1* | 10/2020 | Agarwal | G06K 9/6264 |
| 2020/0327079 | A1* | 10/2020 | Zhao | G06F 13/28 |
| 2020/0349385 | A1* | 11/2020 | Xu | G06K 9/6256 |
| 2021/0012200 | A1* | 1/2021 | Lyske | G06K 9/6215 |
| 2021/0073652 | A1* | 3/2021 | Faith | G06N 3/08 |
| 2021/0089960 | A1* | 3/2021 | Gupta | G06N 5/04 |
| 2021/0099310 | A1* | 4/2021 | Fang | H04L 9/0643 |
| 2021/0103511 | A1* | 4/2021 | Wang | G06F 11/0709 |
| 2021/0142063 | A1* | 5/2021 | Moon | G06K 9/00711 |

OTHER PUBLICATIONS

"Deep Discrete Supervised Hashing"; Qing-Yuan Jiang, IEEE Transactions on Image Processing, vol. 27, No. 12, Dec. 2018 (Year: 2018).*

"Deep Hashing for Large-scale Image Retrieval"; Li Mengting, Proceedings of the 36th Chinese Control Conference Jul. 26-28, 2017, Dalian, China (Year: 2017).*

"Deep Hashing with Category Mask for Fast Video Retrieval"; Xu Liu, arXiv:1712.08315v2 [cs.CV] May 24, 2018 (Year: 2018).*

* cited by examiner

METHOD FOR VALUATION OF IMAGE DARK DATA BASED ON SIMILARITY HASHING

CROSS-REFERENCE TO RELATED APPLICATIONS

Pursuant to 35 U.S.C.§ 119 and the Paris Convention Treaty, this application claims foreign priority to Chinese Patent Application No. 201910557932.9 filed Jun. 26, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure belongs to the field of image data mining, and more particularly to a method for valuation of image dark data based on similarity hashing.

With the rapid development of cloud computing and Internet and exponential growth of data, costs for storage systems and data centers have been on the rise.

Dark data, i.e., unlabeled and unrelated data acquired through various computer network operations but not used to derive insights or for decision making, has occupied a large amount of storage space.

SUMMARY

The disclosure provides a method and system for valuation of image dark data based on similarity hashing. The method and system help improve the cost performance of the storage of the dark data.

Provided is a method for valuation of image dark data based on similarity hashing, the method comprising:

(1) acquiring a dark dataset, and inputting the dark dataset into a trained deep self-taught hashing algorithm (DSTH) model to obtain a hash code of each image in the dark dataset;

(2) constructing a hash map according to the hash code of each image in the dark dataset obtained in (1), wherein the hash map comprises a plurality of nodes, each node represents the hash code of each image, and connection edges between nodes are elements in a constructed adjacency matrix;

(3) acquiring a significance score of each node in the hash map obtained in (2);

(4) sorting significance scores of the plurality of nodes obtained in (3) in a descending order, and according to a sorting result, outputting images corresponding to top k significance scores of the plurality of nodes to users, where k is a natural number.

Further provided is a method for valuation of image dark data based on similarity hash, the method comprising:

(1) acquiring a dark dataset, and inputting the dark dataset into a trained deep self-taught hashing algorithm (DSTH) model to obtain a hash code of each image in the dark dataset;

(2) constructing a hash map according to the hash code of each image in the dark dataset obtained in (1), wherein the hash map comprises a plurality of nodes, each node represents the hash code of each image, and connection edges between nodes are elements in a constructed adjacency matrix;

(3) acquiring a significance score of each node in the hash map obtained in (2);

(4) receiving, from a user, a query tuple q representing a task T to be mined, the query tuple comprising a plurality of to-be-queried images and corresponding weights thereof; and (5) acquiring a value score S(q) and an importance T(q) of the query tuple q, and returning the value score S(q) and the importance T(q) to the user.

The DSTH model in (1) is trained as follows:

(1-1) acquiring a dataset ImageNet, training GoogLeNet using the dataset ImageNet. and extracting features of the dataset ImageNet using the GoogLeNet as a network model;

(1-2) constructing a map using the features extracted in (1-1) and clustering algorithm, and performing a dimension reduction on the map using Laplacian Eigenmaps (LE) algorithm;

(1-3) binarizing a result obtained from the dimension reduction in (1-2), to obtain hash labels of the dataset ImaggNet; and (1-4) putting the dataset ImageNet into a convolutional neural network model for iterative training to obtain a trained DSTH model.

The clustering algorithm used in (1-2) is a K-nearest neighbor algorithm, in which K is 12.

The elements in the adjacency matrix whose values are equal to −1 represent that there is no edges between the hash codes of two corresponding images in the hash map; the elements in the adjacency matrix whose values are not equal to −1 represent that there is an edge between the hash codes of two corresponding images in the hash map.

The adjacency matrix in (2) is constructed as follows:

(2-1) setting a counter i=1;

(2-2) determining whether i is smaller than a total number of images in the dark dataset, and if so, proceeding to (2-3), otherwise ending;

(2-3) setting the counter j=1;

(2-4) determining whether j is smaller than the total number of images in the dark dataset, if so, proceeding to (2-5), otherwise setting i=i+1 and returning to (2-2);

(2-5) calculating a Hamming distance between the hash code of an i-th image and the hash code of a j-th image in the dark dataset, determining whether the Hamming distance is less than a preset threshold, if so, setting a value of the element M[i][j] in the adjacency matrix equal to the Hamming distance and then proceeding to (2-6), otherwise setting the value of the element M[i][j] in the adjacency matrix equal to −1 and then proceeding to (2-6); and (2-6) setting j=j+1 and returning to (2-4).

(3) comprises:

(3-1) according to the hash map, calculating an iterative coefficient matrix $A_n$ corresponding to the hash map:

$$A_n = \begin{bmatrix} 0 & f_{12} & \cdots & f_{1n} \\ f_{21} & 0 & \cdots & f_{2n} \\ \cdots & \cdots & \cdots & \cdots \\ f_{n1} & f_{n2} & \cdots & 0 \end{bmatrix}$$

wherein n represents the total number of images in the dark dataset, and $$f_{ij} = \frac{1 - d_{ij}}{\sum_{t \in T_j} 1 - d_{ij}}$$

wherein $d_{ij}$ represents the Hamming distance between the i-th node and the j-th node in the hash map, 1 represents a code length of the hash code, and Tj represents a sequential set of subscripts of the nodes connected to the j-th node;

(3-2) iteratively calculating the significance scores of the nodes in the hash map by using the iterative coefficient matrix $A_n$ obtained in (3-1) and the following formula:

$$\begin{bmatrix} R^{c+1}(N_1) \\ R^{c+1}(N_2) \\ \ldots \\ R^{c+1}(N_n) \end{bmatrix} = A_n \begin{bmatrix} R^c(N_1) \\ R^c(N_2) \\ \ldots \\ R^c(N_n) \end{bmatrix}$$

wherein c represents a number of iterations and a vector Rc used for iteration is a column vector that is initially all ones.

The terminating condition of the iterative process in (3-2) is:

$$R^{c+1}(N_m) - R^c(N_m) \leq \varepsilon$$

wherein $m \in [1, n]$, $\varepsilon$ represents the iteration threshold which is equal to $10^{-7}$.

The value score S(q) is calculated using the following formula:

$$S(q) = \sum_{i=1}^{n} \frac{1}{m_i} \sum_{j=1}^{m_i} w_i S_j(img_i)$$

$$s.t. \sum_{i=1}^{n} w_i = 1, w_i \in [0, 1]$$

wherein $img_i$ and $w_i$ represent the i-th image to be queried in the query tuple q and its corresponding weight, respectively, mi represents the number of images matched to the i-th image $img_i$ to be queried in the dark dataset, r represents the matching range set by users, and $S_j(img_i)$ represents a significance score of the j-th image to which the i-th image $img_i$ to be queried matches in the dark dataset, and $j \in [1, m_i]$.

The importance T(q) is calculated using the following formula:

$$T(q) = 1 - R(q)/n$$

wherein $R(q) = v$, $S_v$ represents the significance score of the v-th ranking among the significance scores of all the nodes obtained in (3), and the value of v must satisfy $$S_{r-1} \geq S(q) \geq S_v.$$

Advantages of the method and system for valuation of image dark data based on similarity hashing according to embodiments of the disclosure are summarized as follows:

(1) The method analyzes and evaluates the semantic content and value of dark data by using the similarity hashing algorithm and the graph-structure ranking algorithm, providing a new solution to light up the dark data, and giving the similarity hashing algorithm and hash map a new meaning and utilization value.

(2) The method adopts the DSTH algorithm in the process of acquiring image hash code, which obtains hash tags by self-learning method, and subsequently trains a simple customized network by learning hash tags. The process of self-learning to generate tags not only adopts the feature extraction of the depth model, but also combines the similarity connection and mapping among features, which makes the hash tags have both semantic perception similarity and data perception similarity, so that the learned hash function is capable of having a better generalization ability.

(3) The method uses a convolutional neural network model to learn the hash function, so that this algorithm based on hash function is more efficient for mapping images.

(4) The process of constructing the hash map of the method is based on the Hamming distance between the nodes in the hash map, and the calculation method of which is bitwise operation; compared with other composition methods, the method has great advantages in the speed of constructing the map.

(5) The method does the calculation of node importance by means of graph-structure ranking algorithm, which integrates the number of edges connected between the nodes, the weights on the edges, and the importance of the adjacent nodes as the influence factors; the nodes with more centralized semantics and stronger influence in the map are thus ranked near the top, but the nodes with less centralized semantics and weak influence are ranked near the bottom, in addition, the method has a higher iteration speed.

(6) Operations (4) and (5) of the method is capable of responding to the real-time query and evaluation request sent by users; then perform dataset matching and weighted calculation according to the query tuple image input by users; finally return the value score and importance, as well as give corresponding suggestions, all of which allow users to consider whether it is worthwhile to perform data mining for this query tuple in this dark data according to the evaluation results and suggestions;

(7) Compared with the conventional classification models, the evaluation method of the disclosure effectively reduces the number of images recommended by the rough classification, further matching more accurate images and reducing the time cost for subsequent data mining.

DETAILED DESCRIPTION OF DRAWINGS

Figure 2:
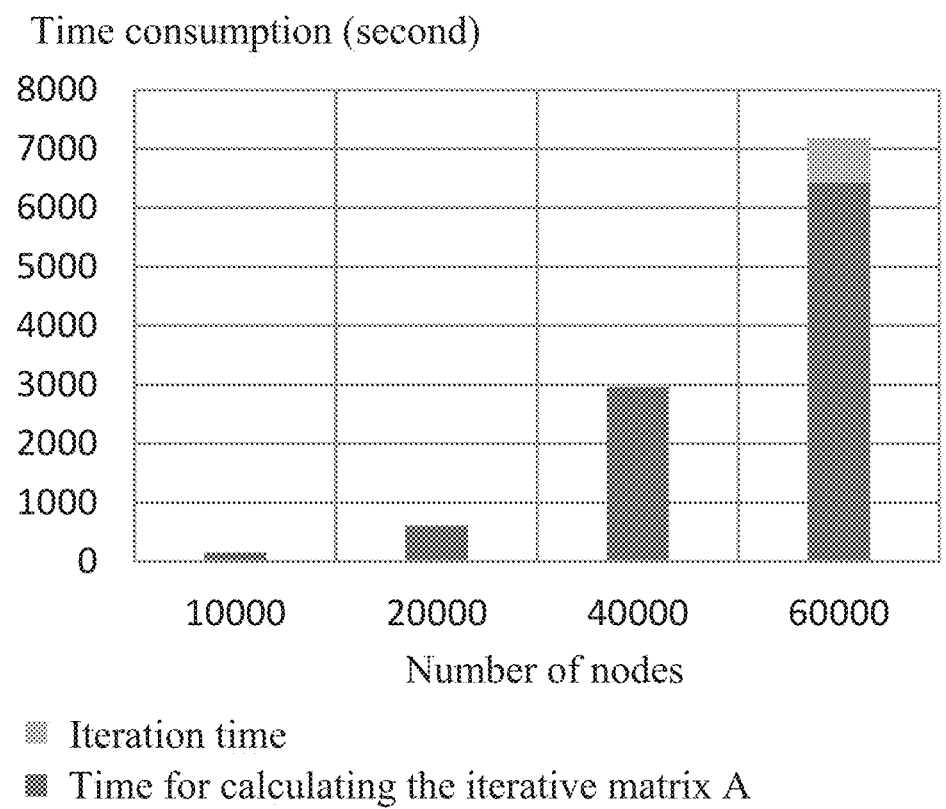

FIG. 1 is a flow diagram of a method for valuation of image dark data based on similarity hashing according to one embodiment of the disclosure; and FIG. 2 is a computational time-consuming diagram of the SHR algorithm at different number of nodes according to one embodiment of the disclosure.

DETAILED DESCRIPTION

To further illustrate, examples detailing a method for valuation of image dark data based on similarity hashing are described below. It should be noted that the following examples are intended to describe and not to limit the description.

The treatment schemes of dark data mainly includes two types, one is to establish an evaluation mechanism to delete data, and the other is to determine the potential value of mining associated data; the former judges whether the data is redundant from the perspective of saving storage space and cost; from the perspective of increasing the value of data, the latter recommends the data that more closely matches the user's demands to the user through association analysis, so that the user perceives the existence of the data, and thus re-examines the value of the data. Taking the large amount of image backup data stored on the social network platform as an example. These image backup data are often stored separately as separate resources from the business. After storage they are quickly reduced to dark data because they are hardly used again, but still occupy a large amount of server resources. Therefore, it is an urgent task to evaluate these image dark data to help users understand their value and improve the price/performance of storage. However, there is currently no processing solution from the perspective of semantic extraction and correlation analysis of large-scale image dark data.

The semantic association analysis of images involves two parts: semantic expression and association analysis. Similarity hashing is a method for quickly finding or deduplicating similar data, often used as a semantic representation of images for large-scale images searching and matching. Shallow hash algorithms often only perform classification or clustering tasks based on data features and cannot select data features based on tasks, resulting in the accuracy is limited. Although the deep hashing method performs feature extraction better, its strong dependence on the classification label makes it ignore the self-association between data, does not have generalization ability, and is difficult to adapt to the unlabeled big data scene. In the field of data association analysis, the organization of the map makes the correlation query convenient and quick, and the random-walk algorithm of the graph is also used to mine the correlation information between the data.

As shown in FIG. 1, the disclosure provides a method for valuation of image dark data based on similarity hashing, the method comprising:

(1) acquiring a dark dataset, and inputting the dark dataset into a trained deep self-taught hashing algorithm (DSTH) model to obtain a hash code of each image in the dark dataset.

Specifically, the dark dataset used is the dataset ImageNet.

The DSTH model in (1) is trained using the following steps:

(1-1) acquiring a dataset ImageNet, training GoogLeNet using the dataset ImageNet, and extracting features of the dataset ImageNet using the GoogLeNet as a network model;

(1-2) constructing a map using the features extracted in (1-1) and clustering algorithm, and performing a dimension reduction (the data feature in the graph is mapped to a predefined one-dimension space) on the map using Laplacian Eigenmaps (LE) algorithm.

Specifically, the clustering algorithm used in (1) is K-nearest neighbor algorithm (KNN), in which the K value is 12.

Since the clustering algorithm is added to the LE composition process, DSTH has strong generalization ability while retaining the classification information of original semantic.

(1-3) Binarizing a result obtained from the dimension reduction in (1-2), to obtain hash labels of the dataset ImaggNet.

(1-4) Putting the dataset ImageNet into a convolutional neural network model for iterative training to obtain a trained DSTH model.

In this step, the number of iteration is 60000 during the iteration process.

The network structure of convolutional neural network model is shown in Table 1 below:

TABLE 1

| Number of layers | Types | Nuclear size | Fill | Stride | Number of output channels | Output dimension |
|---|---|---|---|---|---|---|
| 1 | Convolution layer | 5 × 5 | 2 | 1 | 32 | 32 × 32 × 32 |
| 2 | Maximum pooling layer | 3 × 3 | 0 | 2 | / | 15 × 15 × 32 |
| 3 | Convolution layer | 5 × 5 | 2 | 1 | 32 | 15 × 15 × 32 |
| 4 | Average pooling layer | 3 × 3 | 0 | 2 | / | 7 × 7 × 32 |
| 5 | Convolution layer | 5 × 5 | 2 | 1 | 64 | 7 × 7 × 64 |
| 6 | Average pooling layer | 3 × 3 | 0 | 2 | / | 3 × 3 × 64 |
| 7 | Fully connected layer | / | / | / | / | 1 × 4096 |
| 8 | Slice layer + Fully connected layer | / | / | / | / | 16 × z (z = 1, 2, 3, 4, 5) |
| 9 | Activation layer | / | / | / | / | 16 × z (z = 1, 2, 3, 4, 5) |

The convolutional neural network model is combined with a slice layer and an activating (BatchNorm) layer as a slice network and an activation function, wherein the slice layer has a slice number of 16. When the objective function is optimized using the gradient descent method, the learning rate lr=0.001, the impulse $\xi$=0.9, and the weight decay $\psi$=0.004.

(2) Constructing a hash map according to the hash code of each image in the dark dataset obtained in (1), wherein the hash map comprises a plurality of nodes, each node represents the hash code of each image and connection edges between nodes are elements in a constructed adjacency matrix.

The elements in the adjacency matrix whose values are equal to −1 represent that there is no edges between the hash codes of two corresponding images in the hash map; the elements in the adjacency matrix whose values are not equal to −1 represent that there is an edge between the hash codes of two corresponding images in the hash map.

The adjacency matrix in (2) is constructed as follows:

(2-1) setting a counter i=1;

(2-2) determining whether i is smaller than a total number of images in the dark dataset, and if so, proceeding to (2-3), otherwise ending;

(2-3) setting the counter j=1;

(2-4) determining whether j is smaller than the total number of images in the dark dataset, if so, proceeding to (2-5), otherwise setting i=i+1 and returning to (2-2):

(2-5) calculating a Hamming distance between the hash code of an i-th image and the hash code of a j-th image in the dark dataset, determining whether the Hamming distance is less than a preset threshold, if so, setting a value of the element M[i][j] in the adjacency matrix equal to the Hamming distance and then proceeding to (2-6), otherwise setting the value of the element M[i][j] in the adjacency matrix equal to −1 and then proceeding to (2-6); the preset threshold is equal to the half of length of hash code; and (2-6) setting j=j+1 and returning to (2-4).

(3) Acquiring a significance score of each node in the hash map obtained in (2), which comprises:

(3-1) according to the hash map, calculating the iterative coefficient matrix $A_n$ corresponding to the hash map:

$$A_n = \begin{bmatrix} 0 & f_{12} & \ldots & f_{1n} \\ f_{21} & 0 & \ldots & f_{2n} \\ \ldots & \ldots & \ldots & \ldots \\ f_{n1} & f_{n2} & \ldots & 0 \end{bmatrix}$$

wherein n represents the total number of images in the dark dataset, and $$f_{ij} = \frac{1 - d_{ij}}{\sum_{t \in T_j} 1 - d_{ij}}$$

wherein $d_{ij}$ represents the Hamming distance between the i-th node and the j-th node in the hash map, 1 represents a code length of the hash code, and Tj represents a sequential set of subscripts of the nodes connected to the j-th node:

(3-2) iteratively calculating the significance scores of all nodes in the hash map by using the iterative coefficient matrix $A_n$ obtained in (3-1) and the following formula:

$$\begin{bmatrix} R^{c+1}(N_1) \\ R^{c+1}(N_2) \\ \ldots \\ R^{c+1}(N_n) \end{bmatrix} = A_n \begin{bmatrix} R^c(N_1) \\ R^c(N_2) \\ \ldots \\ R^c(N_n) \end{bmatrix}$$

wherein c represents the number of iterations and the vector Rc used for iteration is a column vector that is initially all ones.

The terminating condition of the iterative process in (3-2) is:

$$R^{c+1}(N_m) - R(N_m) \leq \varepsilon$$

wherein m∈[1, n], ε represents the iteration threshold which is equal to 10.

(4) Sorting the significance scores of all the nodes obtained in (3) in a descending order, and according to a sorting result, outputting images corresponding to top k significance scores of the plurality of nodes to users, then ending the operation.

Specifically, k is a natural number, and its value is set by users.

As another implementation mode of the disclosure, the above (4) may also be replaced by:

(4') receiving, from a user, a query tuple q representing a task T to be mined, the query tuple comprising a plurality of to-be-queried images and corresponding weights thereof, and (5') acquiring a value score S(q) and an importance T(q) of the query tuple q, and returning the value score S(q) and the importance T(q) to the user.

The value score S(q) is calculated using the following formula:

$$S(q) = \sum_{i=1}^{n} \frac{1}{m_i} \sum_{j=1}^{m_i} w_i S_j(img_i)$$

$$s.t. \sum_{i=1}^{n} w_i = 1, w_i \in [0, 1]$$

wherein $img_i$ and $w_i$ represent the i-th image to be queried in the query tuple q and its corresponding weight, respectively, mi represents the number of images matched to the i-th image $img_i$ to be queried in the dark dataset, r represents the matching range set by users, and $S_j(img_i)$ represents a significance score of the j-th image to which the i-th image $img_i$ to be queried matches in the dark dataset, and j∈[1, $m_i$].

The importance T(q) is calculated using the following formula:

$$T(q) = 1 - R(q)/n$$

wherein $R(q) = v$, $S_v$ represents the significance score of the v-th ranking among the significance scores of all the nodes obtained in (3), and the value of v must satisfy $$S_{v-1} \geq S(q) \geq S_v.$$

Performance Testing

The performance of the Semantic Hash Ranking (SHR) algorithm involved in (4') and (5') is measured in terms of time efficiency. The iteration and calculation of the algorithm are carried out and the number iteration and calculation time of the algorithm are recorded, which are both by gradually increasing the number of nodes in the map. In this part, the hash code generated by the previous dataset CIFAR-10 is used as the data source, the map edge threshold Ω is half (24 bits) of the hash-code length (48 bits), and the termination condition=1.0E-7 (refer to Equation 3-20) that is for the iteration in the algorithm. The test results are shown in Table 2 and FIG. 2 below.

TABLE 2

| Number of nodes | Time for calculating the iterative matrix (s) | Iteration time (s) | Overall calculation time (s) | Number of iterations |
| --- | --- | --- | --- | --- |
| 1000 | 1.63 | 0.067 | 1.697 | 40 |
| 5000 | 36.96 | 0.918 | 37.878 | 42 |
| 10000 | 159.68 | 3.153 | 162.833 | 43 |
| 20000 | 598.86 | 10.822 | 609.682 | 44 |
| 40000 | 2946.66 | 71.297 | 3017.957 | 46 |
| 60000 | 6416.25 | 763.186 | 7179.436 | 47 |

The above results show that the number of iterations and the computational time of the algorithm increase with the number of nodes. The longer time-consuming is not on account of the iterative process of the algorithm, but the process of calculating the iterative matrix A. Moreover, the number of iterations of the algorithm does not increase too much as the number of nodes increases, indicating that the SHR algorithm proposed by the method converges relatively quickly even in the face of large-scale datasets.

It will be obvious to those skilled in the art that changes and modifications may be made, and therefore, the aim in the appended claims is to cover all such changes and modifications.

What is claimed is:
1. A computer-implemented method, comprising:
   (1) acquiring a dark dataset, and inputting the dark dataset into a trained deep self-taught hashing algorithm (DSTH) model to obtain a hash code of each image in the dark dataset;
   (2) constructing a hash map according to the hash code of each image in the dark dataset obtained in (1), wherein the hash map comprises a plurality of nodes, each node represents the hash code of each image, and connection edges between nodes are elements in a constructed adjacency matrix;

(3) acquiring a significance score of each node in the hash map obtained in (2);

(4) receiving, from a user, a query tuple q representing a task T to be mined, the query tuple comprising a plurality of to-be-queried images and corresponding weights thereof; and (5) acquiring a value score S(q) and an importance T(q) of the query tuple q, and returning the value score S(q) and the importance T(q) to the user.

2. The computer-implemented method of claim 1, wherein the DSTH model in (1) is trained as follows:
   (1-1) acquiring a dataset ImageNet, training GoogLeNet using the dataset ImageNet, and extracting features of the dataset ImageNet using the GoogLeNet as a network model;
   (1-2) constructing a map using the features extracted in (1-1) and clustering algorithm, and performing a dimension reduction on the map using Laplacian Eigenmaps (LE) algorithm;
   (1-3) binarizing a result obtained from the dimension reduction in (1-2), to obtain hash labels of the dataset ImaggNet; and
   (1-4) putting the dataset ImageNet into a convolutional neural network model for iterative training to obtain a trained DSTH model.

3. The computer-implemented method of claim 1, wherein the clustering algorithm used in (1-2) is a K-nearest neighbor algorithm, in which K is 12.

4. The computer-implemented method of claim 1, wherein the elements in the adjacency matrix whose values are equal to −1 represent that there is no edges between the hash codes of two corresponding images in the hash map; the elements in the adjacency matrix whose values are not equal to −1 represent that there is an edge between the hash codes of two corresponding images in the hash map.

5. The computer-implemented method of claim 1, wherein the adjacency matrix in (2) is constructed as follows:
   (2-1) setting a counter i=1;
   (2-2) determining whether i is smaller than a total number of images in the dark dataset, and if so, proceeding to (2-3), otherwise ending;
   (2-3) setting the counter j=1;
   (2-4) determining whether j is smaller than the total number of images in the dark dataset, if so, proceeding to (2-5), otherwise setting i=i+1 and returning to (2-2);
   (2-5) calculating a Hamming distance between the hash code of an i-th image and the hash code of a j-th image in the dark dataset, determining whether the Hamming distance is less than a preset threshold, if so, setting a value of the element M[i][j] in the adjacency matrix equal to the Hamming distance and then proceeding to (2-6), otherwise setting the value of the element M[i][j] in the adjacency matrix equal to −1 and then proceeding to (2-6); and
   (2-6) setting j=j+1 and returning to (2-4).

6. The computer-implemented method of claim 5, wherein (3) comprises:
   (3-1) according to the hash map, calculating an iterative coefficient matrix $A_n$ corresponding to the hash map:

$$A_n = \begin{bmatrix} 0 & f_{12} & \cdots & f_{1n} \\ f_{21} & 0 & \cdots & f_{2n} \\ \cdots & \cdots & \cdots & \cdots \\ f_{n1} & f_{n2} & \cdots & 0 \end{bmatrix}$$

wherein n represents the total number of images in the dark dataset, and $$f_{ij} = \frac{l - d_{ij}}{\sum_{t \in T_j} l - d_{tj}}$$

wherein $d_{ij}$ represents the Hamming distance between the i-th node and the j-th node in the hash map, l represents a code length of the hash code, and Tj represents a sequential set of subscripts of the nodes connected to the j-th node; and (3-2) iteratively calculating the significance scores of the nodes in the hash map by using the iterative coefficient matrix $A_n$ obtained in (3-1) and the following formula:

$$\begin{bmatrix} R^{c+1}(N_1) \\ R^{c+1}(N_2) \\ \cdots \\ R^{c+1}(N_n) \end{bmatrix} = A_n \begin{bmatrix} R^c(N_1) \\ R^c(N_2) \\ \cdots \\ R^c(N_n) \end{bmatrix}$$

wherein c represents a number of iterations and a vector Rc used for iteration is a column vector that is initially all ones.

7. The computer-implemented method of claim 6, wherein the terminating condition of the iterative process in (3-2) is:

$$R^{c+1}(N_m) - R^c(N_m) \leq \varepsilon$$

wherein m∈[1, n], ε represents the iteration threshold which is equal to $10^{-7}$.

8. The computer-implemented method of claim 7, wherein the value score S(q) is calculated using the following formula:

$$S(q) = \sum_{i=1}^{n} \frac{1}{m_i} \sum_{j=1}^{m_i} w_i S_j(img_i)$$

$$s.t. \sum_{i=1}^{n} w_i = 1, w_i \in [0, 1]$$

wherein $img_i$ and $w_i$ represent the i-th image to be queried in the query tuple q and its corresponding weight, respectively, ml represents the number of images matched to the i-th image $img_i$ to be queried in the dark dataset, r represents the matching range set by users, and $S_j(img_i)$ represents a significance score of the j-th image to which the i-th image $img_i$ to be queried matches in the dark dataset, and j∈[1, $m_i$].

9. The computer-implemented method of claim 8, wherein the importance T(q) is calculated using the following formula:

$$T(q) = 1 - R(q)/n$$

wherein R(q)=v, $S_v$ represents the significance score of the v-th ranking among the significance scores of the nodes obtained in (3), and the value of v must satisfy $S_{v-1} \geq S(q) \geq S_v$.

* * * * *